United States Patent
Wyble

(10) Patent No.: US 10,872,582 B2
(45) Date of Patent: Dec. 22, 2020

(54) METHOD AND APPARATUS FOR INCREASED COLOR ACCURACY OF DISPLAY BY COMPENSATING FOR OBSERVER'S COLOR VISION PROPERTIES

(71) Applicant: Vid Scale, Inc., Wilmington, DE (US)

(72) Inventor: David Wyble, Webster, NY (US)

(73) Assignee: Vid Scale, Inc., Wilmington, DE (US)

(*) Notice: Subject to any disclaimer, the term of this patent is extended or adjusted under 35 U.S.C. 154(b) by 0 days.

(21) Appl. No.: 16/280,866

(22) Filed: Feb. 20, 2019

(65) Prior Publication Data
US 2019/0266976 A1 Aug. 29, 2019

Related U.S. Application Data

(60) Provisional application No. 62/636,001, filed on Feb. 27, 2018.

(51) Int. Cl.
G09G 5/02 (2006.01)
G02B 27/01 (2006.01)

(52) U.S. Cl.
CPC .......... G09G 5/02 (2013.01); G02B 27/0101 (2013.01); G02B 2027/014 (2013.01); G02B 2027/0112 (2013.01); G09G 2320/0242 (2013.01); G09G 2340/06 (2013.01); G09G 2354/00 (2013.01); G09G 2360/144 (2013.01); G09G 2360/16 (2013.01)

(58) Field of Classification Search
CPC ............ G09G 5/02; G09G 2320/0242; G09G 2340/06; G09G 2354/00; G09G 2360/144; G09G 2360/16; G02B 27/0101; G02B 2027/0112; G02B 2027/014
See application file for complete search history.

(56) References Cited

U.S. PATENT DOCUMENTS 9,501,870 B2   11/2016   Takayama
2002/0057280 A1*  5/2002   Anabuki ............ G02B 27/017
                                                  345/633
(Continued)

FOREIGN PATENT DOCUMENTS

| EP | 1079605 A2 | 2/2001 |
| EP | 2886039 A1 | 6/2015 |
| WO | 2015086530 A1 | 6/2015 |

OTHER PUBLICATIONS

CIE, "Fundamental Chromaticity Diagram with Physiological Axes Part 1." CIE Publication No. 170, (2005), 54 pages.
(Continued)

Primary Examiner — Ke Xiao
Assistant Examiner — Jed-Justin Imperial
(74) Attorney, Agent, or Firm — Invention Mine LLC

(57) ABSTRACT

Systems and methods are described for adjusting the color spectrum of synthetic objects in augmented reality (AR) displays under varying lighting conditions and a human observers spectral sensitivities, to produce customized color matches for a specific observer. Spectral data may be captured, and color matching functions (CMFs) of the observer may be used by a spectral color workflow that produces color display values, for example coordinates in RGB space. The color rendering may custom-match for multiple observers with different color perceptions under a wide range of environmental (ambient lighting) conditions.

20 Claims, 11 Drawing Sheets

(56) References Cited

U.S. PATENT DOCUMENTS

| | | | |
|---|---|---|---|
| 2009/0067016 A1* | 3/2009 | Manabe | H04N 1/46 358/518 |
| 2009/0195670 A1 | 8/2009 | Koishi | |
| 2009/0257648 A1 | 10/2009 | Edge | |
| 2012/0147163 A1 | 6/2012 | Kaminsky | |
| 2012/0163716 A1 | 6/2012 | Kishimoto | |
| 2014/0028699 A1 | 1/2014 | Kurtz | |
| 2014/0240341 A1* | 8/2014 | Oda | G09G 5/02 345/590 |
| 2015/0124244 A1* | 5/2015 | Earl | G01J 5/0862 356/43 |
| 2017/0205977 A1 | 7/2017 | Fertik | |

OTHER PUBLICATIONS

Melillo, P. et. al., "Wearable Improved Vision System for Color Vision Deficiency Correction". IEEE Journal of Translational Engineering in Health and Medicine, vol. 5, (2017), 7 pages.

Tanuwidjaja, E., et. al., "Chroma: A Wearable Augmented-Reality Solution for Color Blindness". UbiComp, (2014), 12 pages.

Dicherman, B., et. al. "Effect of Observer Metamerism on Colour Matching of Display and Surface Colours". Color Research & Application, vol. 33, Issue. 5, (2008), pp. 346-359.

Asano, Y, et. al., "Individual Colorimetric Observer Model." PLOS ONE, 11(2), Feb. 10, 2016, available at: https://doi.org/10.1371/journal.pone.0145671, pp. 1-19.

CIE "Colorimetry." CIE Publication No. 15, (2004), 80 pages.

Treutwein, B., "Adaptive Psychophysical Procedures". Vision Research vol. 35, No. 17, (1995), pp. 2503-2522.

Asano, Y. "Individual Colorimetric Observers for Personalized Color Imaging". Rochester Institute of Technology, (2015). 167 pages.

Display Daily, "Samsung Launches SeeColors App for QLED TV to Support People with Color Vision Deficiency (CVD)". Article, press releases, Nov. 26, 2017, available at: https://www.displaydaily.com/article/press-releases/samsung-launches-seecolors-app-for-qled-tv-to-support-people-with-color-vision-deficiency-cvd, 2 pages.

* cited by examiner

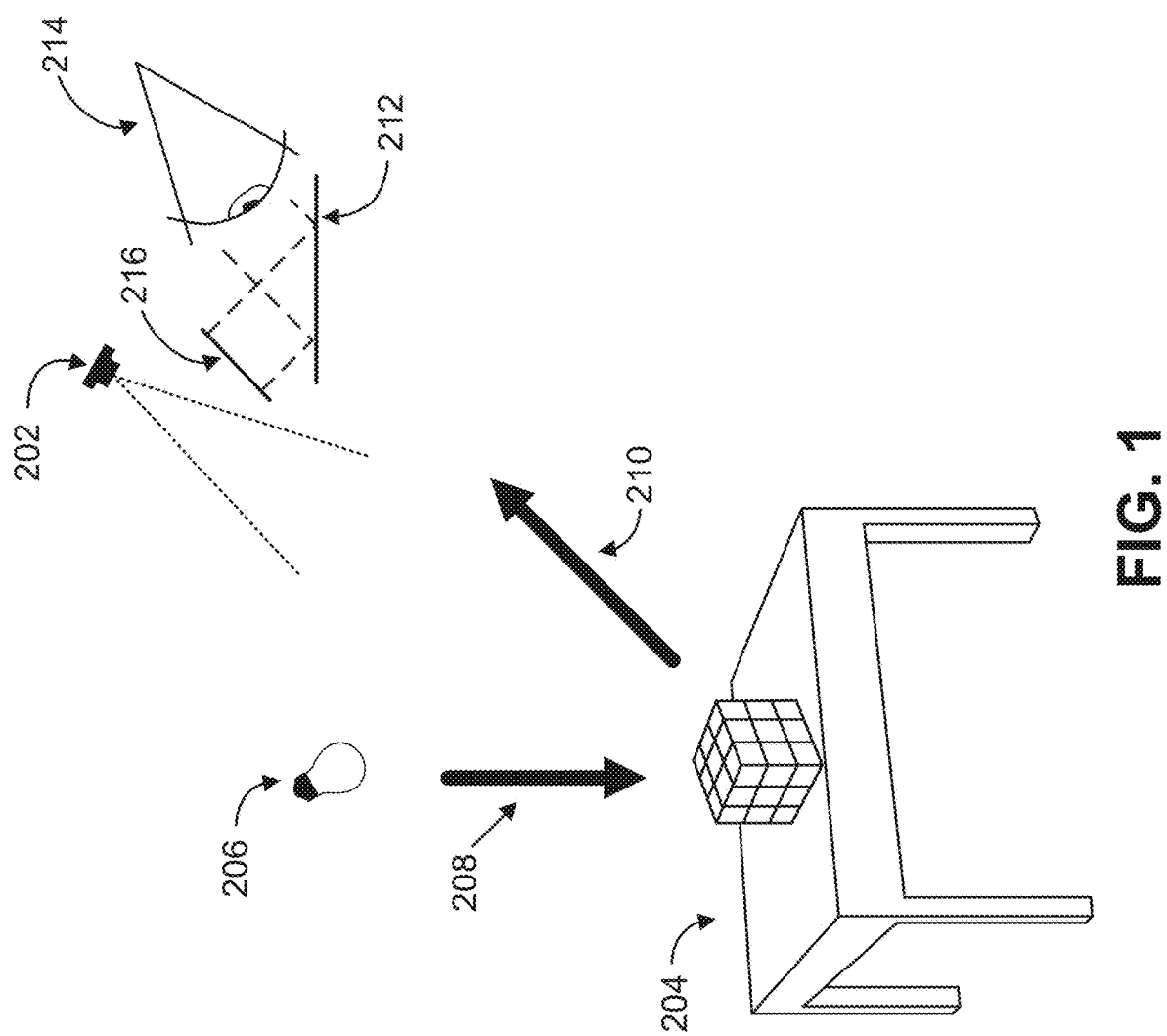

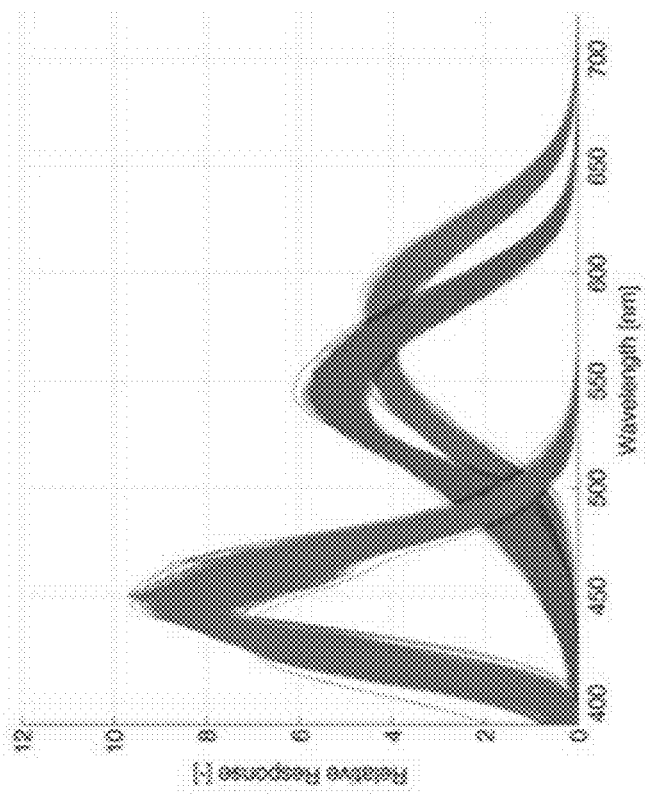
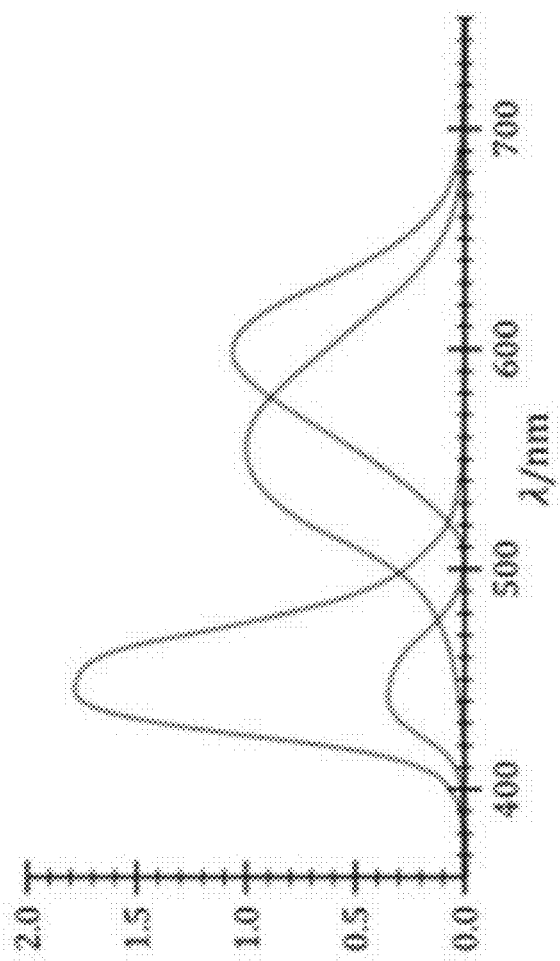
FIG. 2B

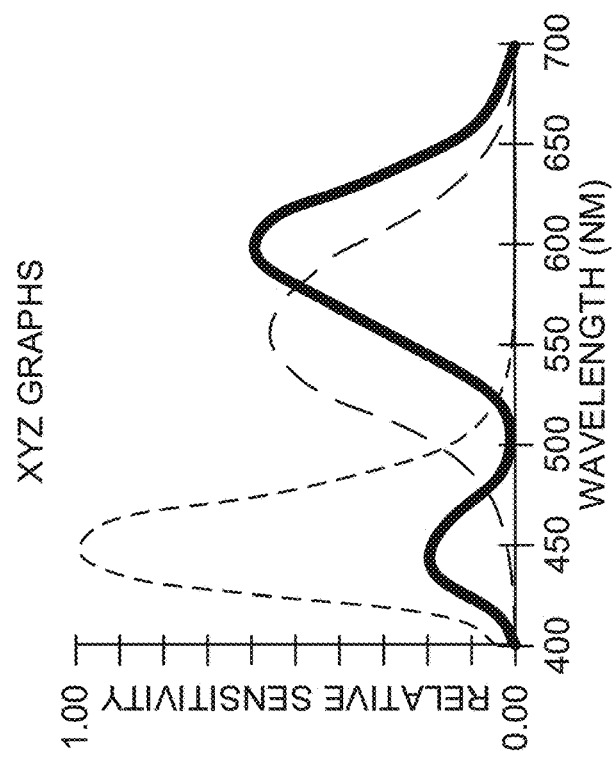
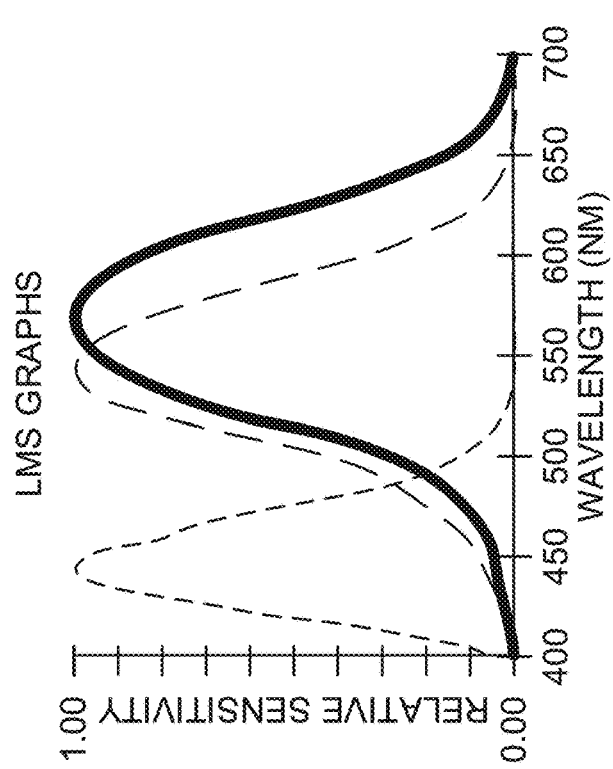
FIG. 3

METHOD AND APPARATUS FOR INCREASED COLOR ACCURACY OF DISPLAY BY COMPENSATING FOR OBSERVER'S COLOR VISION PROPERTIES

CROSS-REFERENCE TO RELATED APPLICATIONS

The present application is a non-provisional filing of, and claims benefit under 35 U.S.C. § 119(e) from, U.S. Provisional Patent Application Ser. No. 62/636,001, entitled "METHOD AND APPARATUS FOR INCREASED COLOR ACCURACY OF DISPLAY BY COMPENSATING FOR OBSERVER'S COLOR VISION PROPERTIES", filed Feb. 27, 2018, which is hereby incorporated by reference in its entirety.

BACKGROUND

With augmented reality (AR) displays, there may be a mismatch of colors, as perceived by a user, between real world objects and representations of virtual objects projected into the user's field of view. This is a result of different phenomena, including the ambient color bias and differences in color perception among different human users.

In 1931, the International Commission on Illumination (CIE) established a "Standard Observer" based on tests of individuals and curve fitting. Color rendition for an average viewer is typically used in television broadcasts. For example, consider the scenario of different observers viewing an AR rendition of a product with a particular color scheme. Due to differences in human color sensitivities, when there are different ambient lighting conditions for the real world environment, different human observers may perceive the color of the synthetic object differently. Common different ambient lighting conditions include incandescent lights, daylight, and florescent lights.

SUMMARY

In some embodiments, a forward-facing imaging spectroradiometer reports the spectral nature of the light within the field of view of an observer. To improve the accuracy of an augmented reality (AR) rendering, the spectral sensitivities of the user can be measured or otherwise estimated. With this spectral sensitivity information and the spectral nature of the real world, rendering the synthetic content can be performed in a way that improves the observers experience of the rendered colors. Using this and other information, the system renders synthetic content appropriate for the observer.

In some embodiments, an optical-see-through augmented reality display produces personally tuned images and information for the (generally) private viewing of the observer. The imagery is a combination of real world content and inserted synthetic content (AR objects). The color of the inserted synthetic content is controlled to harmonize with real world objects using considerations for general viewing conditions and relationships with an observer's visual system.

In some embodiments, current illuminant conditions are measured (e.g. a white point is determined) at an optical-see-through augmented-reality display. Color-matching functions are determined for a user of the display. Based at least in part on the current illuminant conditions and the color-matching functions, tristimulus values (e.g. LMS and/or XYZ values) are determined representing a color of a least a portion of a virtual object. Based at least in part on the tristimulus values, a display color is determined for the portion of the virtual object. The virtual object is displayed on the display using the display color for the portion of the virtual object. In some embodiments, the determination of the display color is further based on the color-matching functions. In some embodiments, the determination of the display color is performed using a display profile to convert from tristimulus values to RGB values.

In some embodiments, the tristimulus values are L, M, and S values, determining a display color includes converting from the L, M, and S tristimulus values to X, Y, and Z tristimulus values (e.g. with a user-adapted transform) and using a display profile to convert from the X, Y, and Z tristimulus values to RGB values. The conversion from the L, M, and S tristimulus values to the X, Y, and Z tristimulus values may be based in part on the color-matching functions of the user.

In some embodiments, the measuring of current illuminant conditions includes determining a value of an illuminating spectral radiance $S(\lambda)$ for each of a plurality of wavelengths $\lambda$.

In some embodiments, the tristimulus values are L, M, and S values, and the color-matching functions comprise values of $\bar{l}(\lambda)$, $\bar{m}(\lambda)$, and $\bar{s}(\lambda)$ for each of a plurality of wavelengths $\lambda$.

In some embodiments, the tristimulus values are X, Y, and Z values, and the color-matching functions comprise values of $\bar{x}(\lambda)$, $\bar{y}(\lambda)$, and $\bar{z}(\lambda)$ for each of a plurality of wavelengths $\lambda$.

Some embodiments include determining object spectral radiance of the portion of the virtual object, wherein the tristimulus values are based in part on the determined object spectral radiance. Determining the object spectral radiance may include determining values $L(\lambda)$ of object spectral radiance reaching the observer for each of a plurality of wavelengths $\lambda$ using $L(\lambda)=S(\lambda)R(\lambda)$, where $S(\lambda)$ is an illuminating spectral radiance representing the current illuminant conditions and $R(\lambda)$ is a spectral reflectance factor of the portion of the virtual object.

In some embodiments, determining the object spectral radiance comprises determining values $L(\lambda)$ of object spectral radiance for each of a plurality of wavelengths $\lambda$, wherein the tristimulus values are L, M, and S values, wherein the color-matching functions comprise values of $\bar{l}(\lambda)$, $\bar{m}(\lambda)$, and $\bar{s}(\lambda)$ for each of a plurality of wavelengths $\lambda$, and wherein the determination of the tristimulus values is performed using:

$$L=\int L(\lambda)\bar{l}(\lambda)d\lambda, M=\int L(\lambda)\bar{m}(\lambda)d\lambda, \text{ and } S=\int L(\lambda)\bar{s}(\lambda)d\lambda.$$

In some embodiments, determining the object spectral radiance comprises determining values $L(\lambda)$ of object spectral radiance for each of a plurality of wavelengths $\lambda$, wherein the tristimulus values are X, Y, and Z values, wherein the color-matching functions comprise values of $\bar{x}(\lambda)$, $\bar{y}(\lambda)$, and $\bar{z}(\lambda)$ for each of a plurality of wavelengths $\lambda$, and wherein the determination of the tristimulus values is performed using:

$$X=\int L(\lambda)\bar{x}(\lambda)d\lambda, Y=\int L(\lambda)\bar{y}(\lambda)d\lambda, \text{ and } Z=\int L(\lambda)\bar{z}(\lambda)d\lambda.$$

In some embodiments, the tristimulus values are L, M, and S values, the color-matching functions comprise values of $\bar{l}(\lambda)$, $\bar{m}(\lambda)$, and $\bar{s}(\lambda)$ for each of a plurality of wavelengths $\lambda$, and determining the display color comprises selecting a display color such that a spectral radiance $L_{display}(\lambda)$ of the display substantially satisfies $$L=\int L_{display}(\lambda)\bar{l}(\lambda)d\lambda, M=\int L_{display}(\lambda)\bar{m}(\lambda)d\lambda, \text{ and } S=\int L_{display}(\lambda)\bar{s}(\lambda)d\lambda.$$

In some embodiments, the tristimulus values are X, Y, and Z values, and determining the display color comprises selecting a display color such that a spectral radiance $L_{display}$ (λ) of the display substantially satisfies $$X=\int L_{display}(\lambda)\bar{x}(\lambda)d\lambda, Y=\int L_{display}(\lambda)\bar{y}(\lambda)d\lambda, \text{ and}$$
$$Z=\int L_{display}(\lambda)\bar{z}(\lambda)d\lambda.$$

In some embodiments, determining color-matching functions of a user of the display comprises determining an age of the user and selecting color-matching functions based on the user's age. In some embodiments, determining color-matching functions of a user of the display comprises retrieving color-matching functions based on a user profile. In some embodiments, the color-matching functions are configured explicitly for an individual user, for example after a measurement process.

In some embodiments, the steps of measuring current illuminant conditions, determining tristimulus values, determining a display color, and displaying the virtual object are performed in real time.

In some embodiments, current illuminant conditions are measured at an optical-see-through augmented-reality display. A color-compensating transform is determined for a user of the display. Based at least in part on the color-compensating transform and the current illuminant conditions, a display color of a least a portion of a virtual object is determined. The virtual object is displayed on the display using the display color for the portion of the virtual object.

In some embodiments, a system includes an optical-see-through augmented-reality display, at least one optical sensor, a processor, and a non-transitory computer-readable medium. The medium stores instructions operative to perform functions comprising: operating the sensor to measure current illuminant conditions; determining color-matching functions of a user of the display; based at least in part on the current illuminant conditions and the color-matching functions, determining tristimulus values representing a color of a least a portion of a virtual object; based at least in part on the tristimulus values, determining a display color for the portion of the virtual object; and displaying the virtual object on the display using the display color for the portion of the virtual object.

BRIEF DESCRIPTION OF THE DRAWINGS

A more detailed understanding may be had from the following description, presented by way of example in conjunction with the accompanying drawings. Furthermore, like reference numerals in the figures indicate like elements.

FIG. 1 is an illustration of an augmented reality (AR) system for combining synthetic content with real world content, according to a possible configuration used in some embodiments.

FIG. 2B shows a comparison of color matching functions between a standard observer (left) and ranges of sensitivities for different real human observers (right).

FIG. 3 shows plots of different notional color spaces related by a transform.

Figure 2A:
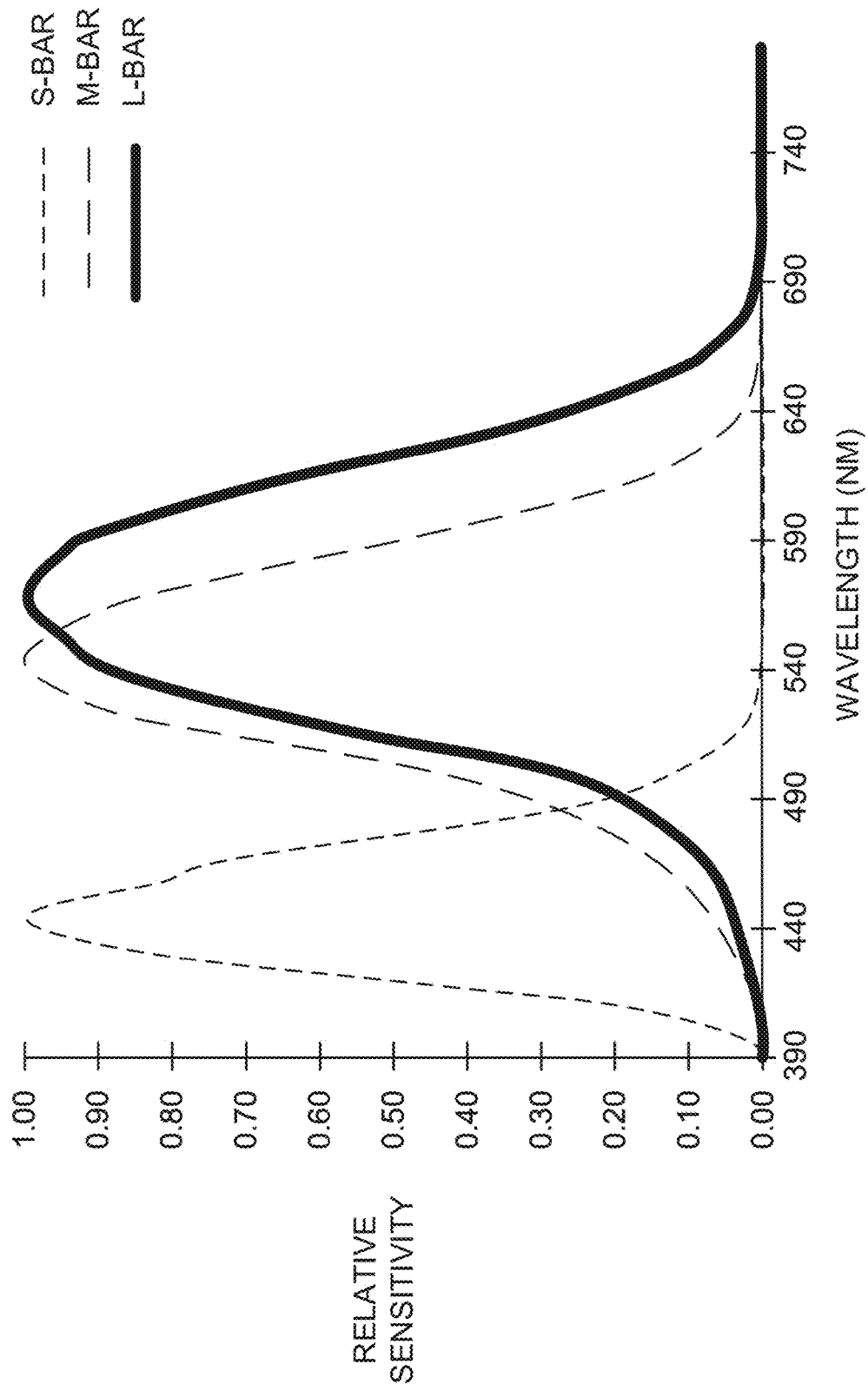
FIG. 2A shows plots of example notional color matching functions (CMFs) for a hypothetical observer.

The entities, connections, arrangements, and the like that are depicted in, and in connection with, the various figures are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least one embodiment, . . . " For brevity and clarity of presentation, this implied leading clause is not repeated ad nauseum in the detailed description of the drawings.

DETAILED DESCRIPTION

With augmented reality (AR) displays, there may be a mismatch of colors, as perceived by a user, between real world objects and representations of virtual objects projected into the user's field of view. This is a result of different phenomena, including the ambient color bias and differences in color perception among different human users.

Scientific literature has established that differences in color perception between people who are otherwise considered color normal can be significant. For example, color perception differences as large as 2.0 units ΔE2000 have been shown in "Effect of Observer Metamerism on Colour Matching of Display and Surface Colours." Oicherman, B; Luo, M R; Rigg, B.; Robertson, A R. Color Research and Application 33, p 346-359, (2008). This figure is within the common range of industrial color tolerances, especially for color critical applications, such as branding.

Without a detailed physical description of the physical properties of the environment, such as ambient lighting, and the observer's spectral sensitivities, an AR display that is attempting to match features of synthetic objects (i.e., virtual objects) with the real world environment can, at best, render matches for an average observer under an assumed white point. The assumed white point is one of the CIE recommended white points (for example CIE Standard Illuminant D65, CIE Standard Illuminant A, or other). The white point is typically applied in color rendering calculations, to account for the observers state of adaption.

In general, existing solutions merely render synthetic content for an average observer. Example embodiments operate to produce customized color matches for a specific observer. The color rendering will custom-match for multiple observers with different color perceptions under a wide range of environmental (e.g., ambient lighting) conditions.

FIG. 1 is an illustration of an augmented reality (AR) system for combining synthetic content with real world content, according to a possible configuration used in some embodiments. The spectral camera 202 measures spectral radiance of the real-world scene 204, which includes a multi-colored cube (for example, a Rubik's cube) resting on a table, illuminated by incident light 208 from a light source 206. The light source introduces an ambient color bias. The camera 202 reports an image of the scene where each pixel of the image captures the spectral radiance of the scene at that location. The properties of the camera can be flexible, but the camera may include the capability to detect and report spectral radiance or an equivalent. The number of image pixels in the camera need not be much greater than the number of pixels in the display used for synthetic object projection. A greater number of camera image pixels can improve a scene capture properties, but at the cost of increased processing time. In cases in which a captured scene image data will be rendered on the display, if the camera resolution is greater than that of the display, the camera image data may will be subsampled to the display resolution, potentially rendering any additional processing time as unnecessary.

The reflected light 210 passes through a half-mirror 212 and is seen by an observer 214, a human user of the system. An LCD augmented reality (AR) display 216 projects images of synthetic objects onto the half mirror. The observer sees the combination. One example embodiment uses a head-mounted LCD, reflected into the observer's field of view by a partially reflective mirror, as the display.

A forward-facing imaging spectroradiometer reports the spectral nature of the light within the field of view of an observer. Using this and other information, the system renders synthetic content appropriate for the observer. By some other means, the spectral nature of the rendered synthetic object(s) is known. To improve the accuracy of the rendering, the spectral sensitivities of the user can be estimated using this system, or determined by other means. With this a priori information and the spectral nature of the real world, rendering the synthetic content can be performed in a way that improves the observer experiences with the desired colors.

In some embodiments, a display produces personally tuned images and information for the (generally) private viewing of the observer. The imagery is a combination of the real world and inserted synthetic content (AR objects). In some embodiments, the color of the inserted content is controlled to harmonize with the real world (with which it is juxtaposed) as well as make considerations for the general viewing conditions and how they relate to the observer's visual system.

A forward-facing camera captures spectral data of the real-world scene within the field of view of the observer. This spatial-spectral data is used to improve the estimation of the scene white point, as well as to facilitate the determination of the specific properties of the observer (e.g., their color matching functions). In some embodiments, the spectral data is applied to a spectral color management workflow; synthetic rendering is made through this workflow, which includes the spectral properties of the real world, the synthetic content itself, and the color matching functions of the observer.

An actual measurement of the scene white point improves this situation somewhat, but still falls short of accounting for an observer's specific color vision. For such a system, effectively, the same image is rendered regardless of the observer's spectral sensitivities or color perception.

Generating Color Matching Functions

In some embodiments, to take full advantage of the spectral rendering capabilities of the system, the color matching functions (CMFs) of the observer are used. CMFs indicate the sensitivity of the observer's visual system to the spectral wavelengths of the light being viewed. FIG. 2A shows plots of example notional color matching functions (CMFs) for a hypothetical user. Relative sensitivity is plotted as a function of wavelength (i.e., a spectral measurement) for three different color receptors (cones) in a human eye to produce LMS graphs (named according to L-cones, M-cones, and S-cones in a human eye). The plots represent LMS signals, which are a series of values at the different wavelengths indicated, having peaks of spectral sensitivity in short ("S", 420 nm-440 nm), middle ("M", 530 nm-540 nm), and long ("L", 560 nm-580 nm) wavelengths. Common colors, identified by their wavelengths in nanometers (nm) are: Blue, 450-495 nm; Green, 495-570 nm; Yellow, 570-590 nm; Orange, 590-620 nm; and Red, 620-750 nm.

FIG. 2B shows a comparison between the standard observer (left) and range of sensitivities for real human observers (right, adapted from Asano et al.). The set of LMS curves on the left shows the CIE standard observer. The right side set of curves shows the aggregated results from 100 different human test subjects.

If an observer's CMFs are already determined, in some embodiments, the system can be configured to accept these a priori data, e.g., stored in memory, as input. Alternatively, in some embodiments, the observer can input, for example, their age and/or the desired size of the field of view, and the processor may determine color matching functions using techniques described by the International Commission on Illumination (CIE) in "Fundamental Chromaticity Diagram with Physiological Axes Part 1." CIE Publication No. 170, Commission Internationale de l'Eclairage (2006).

For many observers, existing data describing their CMFs will not be available. In some embodiments, measurements are performed to estimate their CMFs. Modeling the procedure described in "Individual Colorimetric Observer Model." Asano, Y; Fairchild, M D; Blonde, L. PLoS ONE 11(2): e0145671. doi:10.1371/journal.pone.0145671 (2016), the CMFs can be determined as follows:

1. The observer is be instructed to view a special target, consisting of a series of colored patches, each adjacent to a black patch.
2. For each of the patches, the processor will display a test color over the physical black patch, adjacent to the test patch.
3. The observer will adjust the R, G, and B coordinates of the displayed patch until the closest visual match is produced, e.g. using techniques descried in B. Treutwein, "Adaptive psychophysical procedures," Vision Research 35, Issue 17(1995).
4. Steps 2 and 3 are repeated for the full set of test patches.
5. The matching results are used to select the best fitting parameters for the model described in CIE Publication No. 170. The parameters for the model in CIE Publication No. 170 are the observer age and the field size of the object being viewed. An optimization procedure is used to determine the observer age and viewing field size that best aligns the model results with the matching results. These parameters are stored for the observer and referenced by the processor for rendering calculations.

The number of matches tested may vary in different embodiments. In some embodiments, between ten and fifteen matches are used.

After the CMFs are derived, in some embodiments, they are regressed against the preferred CIE Standard Observer Functions. This results in a transform that will be used in the workflow processing described below. The transform may be a 3×3 matrix, denoted in the flow charts of FIG. 4 and FIG. 5 as "Transform #1."

Depending on the experience of the observer, color matching experiments required in step 3 above can be quite difficult. Thus the determination may be made with appropriately-considered psychophysical experimentation. Rather than a traditional "full factorial" presentation of colors (a simple grid covering the RGB space) a more adaptive method could be employed. One such method that may be employed is described in B. Treutwein, "Adaptive psychophysical procedures," Vision Research 35, Issue 17(1995). In some experiments that may be employed in embodiments applying adaptive methods, the processor adjusts the experimental samples and conditions in response to an observer's responses. In other embodiments, using techniques described in Treutwein (1995), the processor may intelligently select an RGB color close to the target color, thus decreasing the time required by the observer to create a color match.

Spectral Color Workflow

In accordance with some embodiments, workflows will be described for two situations:
(a) when the spectral reflectance data for the synthetic content is known, and (b) when the color coordinates for the synthetic content is known but the spectral reflectance factor is unknown. In both cases, the following data are understood to be available: (a) the spectral radiance of the scene (from the forward facing spectral camera), and (b) the color matching functions of the observer (either as data provided by the observer, or determined based on, e.g., user input or user characteristics as described in the section "Generating Color Matching Functions"). Using these processes, the color rendering pipeline is modified to include personalized color matching functions. Synthetic data that is sent to a display is modified based upon lighting conditions and specifics of personalized color matching functions.

In some embodiments, the following steps are performed:
1. From the forward facing spectral camera, estimate the spectral radiance of the scene white point.
This estimation can be performed in several ways. For example:
   a. Using the "gray world assumption" where the entire scene is averaged
   b. Using the brightest point in the scene.
   c. Using the highlights reflecting off glossy objects.
Other techniques can also be applied. In some embodiments, techniques are adapted from imaging processes that perform white point estimation for the purpose of automatic white balance (AWB).
2. If color data (e.g. XYZ values) are available for the synthetic object, proceed to step 5.
3. The estimated spectral white point is multiplied by the spectral reflectance of the synthetic object to yield the spectral radiance of the object in the scene, which represents the light from the synthetic object that reaches the user's eye.
4. Using the observer's color matching functions (CMFs), convert the object spectral radiance into observer LMS signals. Skip to step 7
5. From the processor-supplied color coordinates (CIELAB coordinates, including metadata consisting of the white point [eg: the illuminant] and the standard observer functions) of the synthetic imagery, apply a chromatic adaptation transform from the assumed white point to the white point estimated in step 1. This results in appropriate XYZ tristimulus values for the synthetic object. The CIELAB coordinates may be calculated under an assumed set of standard observer functions.
6. Regress the standard observer functions of the synthetic imagery against the observer CMFs. This transformation is XYZ to LMS, yielding observer LMS signals.
7. The LMS values are processed to generate XYZ tristimulus values.
8. The XYZ tristimulus values, with the similarly-derived XYZ values for the spectral estimation of the light source, are transformed to CIELAB values using the customary equations described in "Colorimetry." CIE Publication No. 15, Commission Internationale de l'Eclairage (2004).
9. The CIELAB coordinates are further processed with the inverse display model. This results in the rendered display coordinates, for example in RGB space.

Figure 4:
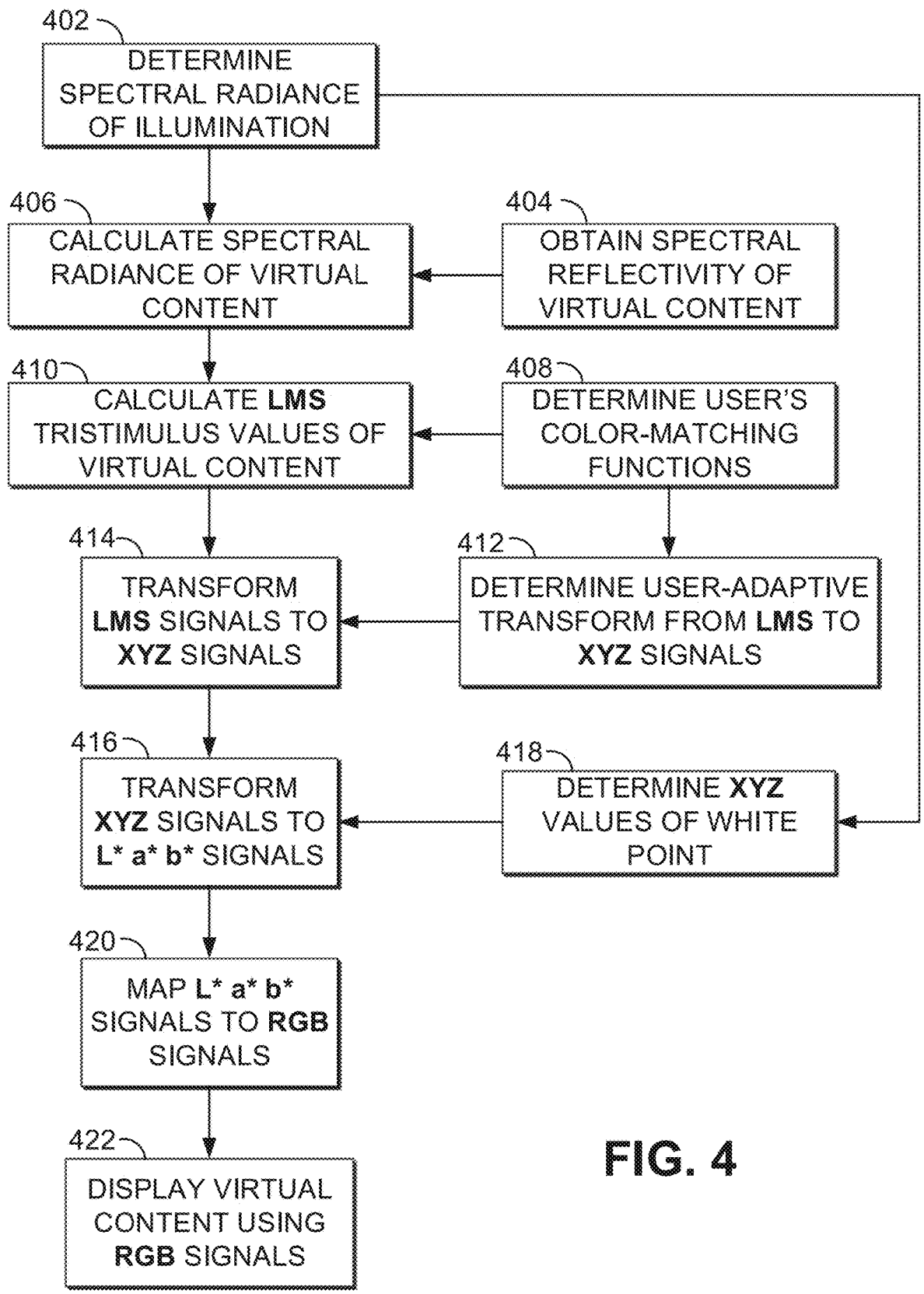
FIG. 4 is a flowchart of a method of using known reflectance values for synthetic imagery, according to some embodiments.

The example method illustrated in FIG. 4 makes use of material properties of the synthetic object (e.g., spectral reflectance factor and/or other properties). With this information, the observers vision system (described by the observer's color matching functions) are accounted for when rendering the synthetic object. The color of the synthetic object can then be found in a color coordinate system (LMS cone signals) referenced to the observer's personal color matching functions. The LMS signals are further transformed into XYZ tristimulus values, then to CIELAB coordinates, and finally into RGB display coordinates. This workflow produces a rendered synthetic image that matches the original synthetic object when viewed under the scene illumination.

Figure 5:
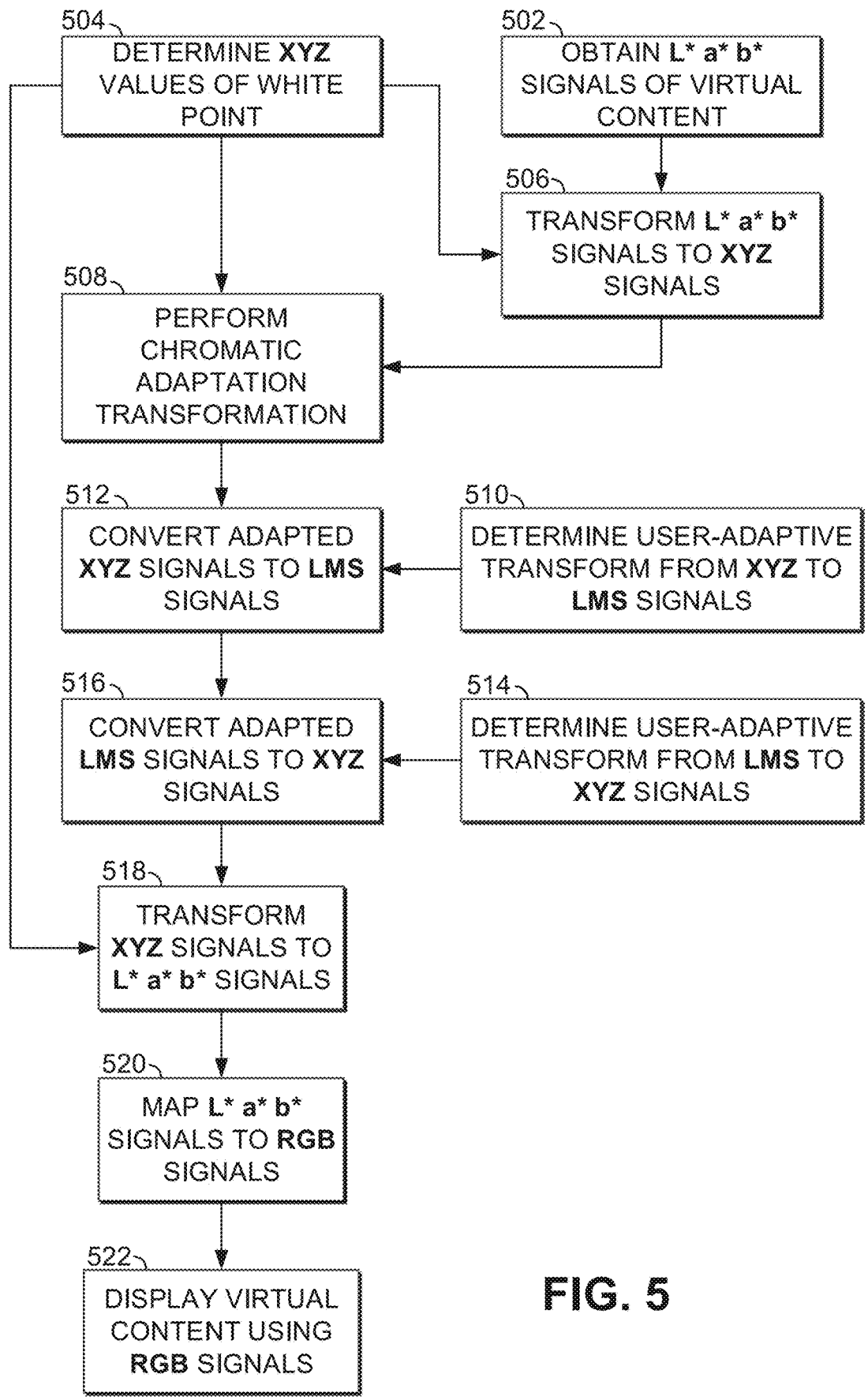
FIG. 5 is a flowchart of a method of using colorimetric values for synthetic imagery, according to some embodiments.

FIG. 5 illustrates a method in which detailed spectral reflectance of the virtual object is not available, but CIELAB color coordinates of the object are available. These CIELAB coordinates are transformed to XYZ tristimulus values, and then again for the scene light source by using a Chromatic Adaptation Transform. The transformed XYZ tristimulus values are processed with the observer color matching functions to create LMS cone signals. These signals represent the observers color perception of the synthetic object when viewed under the scene light source. Once the observer LMS signals are known, remainder of the FIG. 5 workflow may be the same as the workflow of FIG. 4 following the determination of the LMS signals.

In the examples of FIG. 4 and FIG. 5, LMS signals are transformed into XYZ tristimulus values, then to CIELAB coordinates, and finally into RGB display coordinates. This produces a rendered synthetic image that substantially matches the original synthetic object when viewed under the scene illumination. Thus, rather than merely transforming between XYZ, CIELAB and RGB, the methods of FIG. 4 and FIG. 5 handle each of the various color coordinates with respect to an implied light source. The transformation of synthetic object material properties (method of FIG. 4) or synthetic object color (method of FIG. 5) first into observer-referred color space (LMS signals) and then into an XYZ color space, can result in a final rendered output that better matches the properties of the input synthetic object.

The CIELAB coordinates derived above (and thus the rendered RGB display coordinates) represent a numerical description of the color perceived by the observer. They account for the illuminant as well as the observer's sensitivity to different portions of the color light spectrum.

Example embodiments help to reduce the possibility of mismatches due to metamerism, or alternatively, makes metameric objects match or mismatch as they should for the specific observer. For the purposes of this discussion, a pair of metameric objects will match under one light source and mismatch under another. This is due to the fact that the spectral reflectance of the objects is different. In this case the spectral content of the RGB display will not be the same as that of a matching real world object.

In the example of FIG. 4, in step 402, the illuminating spectral radiance $S(\lambda)$ is determined for each of a plurality of wavelengths $\lambda$. In some embodiments, the illuminating spectral radiance is measured explicitly (e.g. by a spectro-radiometer). In some embodiments, the illuminating spectral radiance is determined by detecting a white point and selecting a spectral radiance that corresponds to the white point. In step 404, the spectral reflectivity $R(\lambda)$ of at least a portion of the virtual object is obtained. In some cases, a virtual object may have different values of spectral reflectivity at different surface positions. Those different surface positions may be processed separately (e.g. in parallel). In the following discussion, the processing applied to only a single portion is described, with the understanding the that the same or similar steps may be applied to other portions (e.g. all portions) of a virtual object.

In step 406, the spectral radiance $L(\lambda)$ of the virtual object is determined. This determination may be made by calculating $L(\lambda)=S(\lambda)R(\lambda)$ for each of a plurality of wavelength values $\lambda$. (While embodiments described herein are described in terms of wavelength values $\lambda$, it is to be understood that processing using corresponding frequency values $v$ may alternatively be performed.)

In step 408, the color-matching functions of a user of the display are determined. The color-matching functions may be values of $\bar{l}(\lambda)$, $\bar{m}(\lambda)$, and $\bar{s}(\lambda)$ for each of a plurality of wavelengths $\lambda$. In some embodiments, the color-matching functions are determined through experimentation on the specific user. In some embodiments, the color-matching functions may be determined based on characteristics of the user, such as the user's age, that have been determined to have an effect on a user's color matching functions. The color-matching functions may be selected based on the users characteristics (e.g. color-matching functions that represent a population in the same age group as the user).

In step 410, LMS tristimulus values for the virtual object are determined based on the user's color matching functions $\bar{l}(\lambda)$, $\bar{m}(\lambda)$, and $\bar{s}(\lambda)$ and on the spectral radiance $L(\lambda)$ of the virtual object. In some embodiments, the determination of the tristimulus values is performed according to the following integrals, where the integration is understood to be performed over visible wavelengths.

$$L=\int L(\lambda)\bar{l}(\lambda)d\lambda, M=\int L(\lambda)\bar{m}(\lambda)d\lambda, \text{ and } S=\int L(\lambda)\bar{s}(\lambda)d\lambda.$$

It is to be understood that, in some embodiments, the tristimulus values and other integrals described herein are calculated as an approximation using summation over discrete values. The methods described herein should be understood to encompass the use of such summations or other practical techniques for calculating or approximating integrals.

In step 412, a user-adaptive transform from LMS tristimulus values to XYZ tristimulus values is determined based on the user's color matching functions. FIG. 3 shows plots of different notional color spaces related by such a transform. In FIG. 3, the solid, long dash, and short dash lines in the left-side plot correspond to LMS curves in the LMS color space, as described above with reference to FIG. 2A. The LMS space (left side of FIG. 3) is representative of a hypothetical individual observer; while the XYZ space (right side of FIG. 3) is the traditional CIE space that is used for color display management.

A transform produces the XYZ color space indicated in the right-side XYZ plot. To move between two color spaces, a transform is applied. The transform may be a 3×3 matrix.

To derive the matrix, the spectral curves of the destination space are regressed against those of the source space.

Each curve in both plots of FIG. 3 may be expressed as a vector of N spectral values. For an exemplary system, a typical value of N is 31, for spectral data from 400 nm to 700 nm, with samples $\lambda_i$ every 10 nm. The transformation is therefore from a first N×3 space to a second N×3 space. This can be represented mathematically as a 3×3 matrix M that substantially satisfies $$LMS=M\cdot XYZ$$

or, in terms of values of the color-matching functions for N=31:

$$LMS = \begin{pmatrix} \bar{l}(\lambda_1) & \bar{l}(\lambda_2) & \ldots & \bar{l}(\lambda_{31}) \\ \bar{m}(\lambda_1) & \bar{m}(\lambda_2) & \ldots & \bar{m}(\lambda_{31}) \\ \bar{s}(\lambda_1) & \bar{s}(\lambda_2) & \ldots & \bar{s}(\lambda_{31}) \end{pmatrix}, \text{ and}$$

$$XYZ = \begin{pmatrix} \bar{x}(\lambda_1) & \bar{x}(\lambda_2) & \ldots & \bar{x}(\lambda_{31}) \\ \bar{y}(\lambda_1) & \bar{y}(\lambda_2) & \ldots & \bar{y}(\lambda_{31}) \\ \bar{z}(\lambda_1) & \bar{z}(\lambda_2) & \ldots & \bar{z}(\lambda_{31}) \end{pmatrix} \text{ so}$$

$$\begin{pmatrix} \bar{l}(\lambda_1) & \bar{l}(\lambda_2) & \ldots & \bar{l}(\lambda_{31}) \\ \bar{m}(\lambda_1) & \bar{m}(\lambda_2) & \ldots & \bar{m}(\lambda_{31}) \\ \bar{s}(\lambda_1) & \bar{s}(\lambda_2) & \ldots & \bar{s}(\lambda_{31}) \end{pmatrix} = M \begin{pmatrix} \bar{x}(\lambda_1) & \bar{x}(\lambda_2) & \ldots & \bar{x}(\lambda_{31}) \\ \bar{y}(\lambda_1) & \bar{y}(\lambda_2) & \ldots & \bar{y}(\lambda_{31}) \\ \bar{z}(\lambda_1) & \bar{z}(\lambda_2) & \ldots & \bar{z}(\lambda_{31}) \end{pmatrix}$$

Note that both sides of this equation may be multiplied on the right by a vector representing spectral radiance $$\begin{pmatrix} \bar{l}(\lambda_1) & \bar{l}(\lambda_2) & \ldots & \bar{l}(\lambda_{31}) \\ \bar{m}(\lambda_1) & \bar{m}(\lambda_2) & \ldots & \bar{m}(\lambda_{31}) \\ \bar{s}(\lambda_1) & \bar{s}(\lambda_2) & \ldots & \bar{s}(\lambda_{31}) \end{pmatrix} \begin{pmatrix} L(\lambda_1) \\ L(\lambda_2) \\ \vdots \\ L(\lambda_{31}) \end{pmatrix} =$$

$$M \begin{pmatrix} \bar{x}(\lambda_1) & \bar{x}(\lambda_2) & \ldots & \bar{x}(\lambda_{31}) \\ \bar{y}(\lambda_1) & \bar{y}(\lambda_2) & \ldots & \bar{y}(\lambda_{31}) \\ \bar{z}(\lambda_1) & \bar{z}(\lambda_2) & \ldots & \bar{z}(\lambda_{31}) \end{pmatrix} \begin{pmatrix} L(\lambda_1) \\ L(\lambda_2) \\ \vdots \\ L(\lambda_{31}) \end{pmatrix}$$

to give the following result, illustrating the utility of M in transforming between tristimulus values in different color spaces.

$$\begin{pmatrix} L \\ M \\ S \end{pmatrix} = M \begin{pmatrix} X \\ Y \\ Z \end{pmatrix}$$

It is worth noting that a capital letter L is used to represent both spectral radiance and one of the LMS tristimulus components, while a capital M is used to represent both a transformation matrix and another of the LMS tristimulus components. This usage is in accordance with convention, and the semantics of this notation is believed to be unambiguous when taken in context.

In step 412, the determination of the user-adaptive transform may be performed by selecting an appropriate matrix M. In some embodiments, a solution is obtained by using the Moore-Penrose Pseudoinverse $XYZ^+$ of matrix XYZ. Use of the pseudoinverse may be considered to be equivalent to a least squares regression. Starting from the initial formula $$LMS=M\cdot XYZ$$

both sides may be multiplied on the right by the pseudoinverse XYZ⁺ to obtain $$LMS \cdot XYZ^+ = M \cdot XYZ \cdot XYZ^+.$$

Thus, a matrix M may be selected to satisfy:

$$M = LMS \cdot XYZ^+$$

Which may be expressed, using the formula for the Moore-Penrose Pseudoinverse, as $$M = LMS \cdot (XYZ \cdot XYZ^T)^{-1} \cdot XYZ^T$$

Once the matrix M has been determined, M may be used as follows to transform between LMS and XYZ values as follows.

$$\begin{pmatrix} L \\ M \\ S \end{pmatrix} = M \begin{pmatrix} X \\ Y \\ Z \end{pmatrix}$$

$$\begin{pmatrix} X \\ Y \\ Z \end{pmatrix} = M^{-1} \begin{pmatrix} L \\ M \\ S \end{pmatrix}$$

$$M^{-1} \begin{pmatrix} L \\ M \\ S \end{pmatrix} = M^{-1} M \begin{pmatrix} X \\ Y \\ Z \end{pmatrix}$$

In step 414, the LMS signals of the virtual content that were obtained in step 410 are transformed to XYZ signals using a user-adaptive transform, such as multiplication by $M^{-1}$.

In step 416, the XYZ signals are converted to L*a*b* (or CIELAB) signals representing the color of the virtual object (or portion thereof). This transformation may be performed using a transformation as described in CIE Publication No. 15, in which $$L^* = 116 f\left(\frac{Y}{Y_n}\right) - 16$$

$$a^* = 500 \left[ f\left(\frac{X}{X_n}\right) - f\left(\frac{Y}{Y_n}\right) \right]$$

$$b^* = 200 \left[ f\left(\frac{Y}{Y_n}\right) - f\left(\frac{Z}{Z_n}\right) \right]$$

where $$f\left(\frac{X}{X_n}\right) = \left(\frac{X}{X_n}\right)^{\frac{1}{3}} \quad \text{if} \quad \left(\frac{X}{X_n}\right) > \left(\frac{24}{116}\right)^3$$

$$f\left(\frac{X}{X_n}\right) = \left(\frac{841}{108}\right)\left(\frac{X}{X_n}\right) + \left(\frac{16}{116}\right) \quad \text{if} \quad \left(\frac{X}{X_n}\right) \le \left(\frac{24}{116}\right)^3$$

and $$f\left(\frac{Y}{Y_n}\right) = \left(\frac{Y}{Y_n}\right)^{\frac{1}{3}} \quad \text{if} \quad \left(\frac{Y}{Y_n}\right) > \left(\frac{24}{116}\right)^3$$

$$f\left(\frac{Y}{Y_n}\right) = \left(\frac{841}{108}\right)\left(\frac{Y}{Y_n}\right) + \left(\frac{16}{116}\right) \quad \text{if} \quad \left(\frac{Y}{Y_n}\right) \le \left(\frac{24}{116}\right)^3$$

and $$f\left(\frac{Z}{Z_n}\right) = \left(\frac{Z}{Z_n}\right)^{\frac{1}{3}} \quad \text{if} \quad \left(\frac{Z}{Z_n}\right) > \left(\frac{24}{116}\right)^3$$

$$f\left(\frac{Z}{Z_n}\right) = \left(\frac{841}{108}\right)\left(\frac{Z}{Z_n}\right) + \left(\frac{16}{116}\right) \quad \text{if} \quad \left(\frac{Z}{Z_n}\right) \le \left(\frac{24}{116}\right)^3$$

The transformation of step 416 may be performed using detected white point values $X_n$, $Y_n$, and $Z_n$. The white point values $X_n$, $Y_n$, and $Z_n$ may be determined in step 418 based on the determined spectral radiance or through other techniques.

In step 420, the L*a*b* signals representing the color of the virtual object are mapped to RGB signals or to other signals identifying a display color. This mapping may be performed using, for example, an International Color Consortium (ICC) display profile. In step 422, the display device (e.g. an optical-see-through augmented reality headset) displays the virtual object using the RGB signals.

FIG. 5 illustrates a method performed in an embodiment in which L*a*b* signals (CIELAB) color information is available for virtual content. In step 502, the L*a*b* signals are obtained for the content (or for a portion thereof). In step 504, $X_n$, $Y_n$, and $Z_n$ values representing the current white point are determined (e.g. with the use of a camera or other light sensor).

In step 506, the L*a*b* signals of the virtual content are transformed to XYZ signals with the use of the current white point information $X_n$, $Y_n$, $Z_n$. This transformation may be performed using techniques described in CIE Publication No. 15:

Calculate from the values L*, a*, b*

$$f\left(\frac{Y}{Y_n}\right) = \frac{(L^* + 16)}{116}$$

$$f\left(\frac{X}{X_n}\right) = \frac{a^*}{500} + f\left(\frac{Y}{Y_n}\right)$$

$$f\left(\frac{Z}{Z_n}\right) = f\left(\frac{Y}{Y_n}\right) - \frac{b^*}{200}$$

Calculate then the tristimulus values X, Y, Z from:

$$X = X_n \left[ f\left(\frac{X}{X_n}\right) \right]^3 \quad \text{if} \quad f\left(\frac{X}{X_n}\right) > \frac{24}{116}$$

$$X = X_n \left[ f\left(\frac{X}{X_n}\right) - \frac{16}{116} \right] \times \frac{108}{841} \quad \text{if} \quad f\left(\frac{X}{X_n}\right) \le \frac{24}{116}$$

$$Y = Y_n \left[ f\left(\frac{Y}{Y_n}\right) \right]^3 \quad \text{if} \quad f\left(\frac{Y}{Y_n}\right) > \frac{24}{116} \text{ or } L^* > 8$$

$$Y = Y_n \left[ f\left(\frac{Y}{Y_n}\right) - \frac{16}{116} \right] \times \frac{108}{841} \quad \text{if} \quad f\left(\frac{Y}{Y_n}\right) \le \frac{24}{116} \text{ or } L^* \le 8$$

$$Z = Z_n \left[ f\left(\frac{Z}{Z_n}\right) \right]^3 \quad \text{if} \quad f\left(\frac{Z}{Z_n}\right) > \frac{24}{116}$$

$$Z = Z_n \left[ f\left(\frac{Z}{Z_n}\right) - \frac{16}{116} \right] \times \frac{108}{841} \quad \text{if} \quad f\left(\frac{Z}{Z_n}\right) \le \frac{24}{116}$$

In step 508, a chromatic adaptation transformation may be performed to generate adapted XYZ values that are corrected for the scene white point. One example of a chromatic adaptation transform is based on the von Kries model. This model scales the original LMS values by the ratio of the LMS values of the two whitepoints. In the equation below, the subscripts 1 and 2 represent the original and transformed colors, respectively, and the subscripts a and b represent the original and destination white points.

$$\begin{pmatrix} L_2 \\ M_2 \\ S_2 \end{pmatrix} = \begin{bmatrix} \frac{L_b}{L_a} & 0 & 0 \\ 0 & \frac{M_b}{M_a} & 0 \\ 0 & 0 & \frac{S_b}{S_a} \end{bmatrix} \begin{pmatrix} L_1 \\ M_1 \\ S_1 \end{pmatrix}$$

In step 510, a user-adaptive transform is determined for conversion from XYZ signals to LMS signals. This transform may be based on a users color-matching functions. The transform may be determined using the techniques described above for determining the matrix M. In step 512, the transform is applied to the adapted XYZ values of the virtual content to convert them to user-adapted LMS signals.

In step 514, a user-adaptive transform is determined for conversion from the user-adapted LMS signals to user-adapted XYZ signals. This transform may be based on a user's color-matching functions. The transform may be determined using the techniques described above for determining the matrix M. It may be noted that the values of color matching functions $\bar{x}(\lambda_i)$, $\bar{y}(\lambda_i)$, $\bar{z}(\lambda_i)$ may differ for different white points, so that the transforms in steps 512 and 516 do not cancel each other out for different white points. In step 516, the transform is applied to the user-adapted LMS values of the virtual content to convert them to user-adapted XYZ signals.

In step 518, the XYZ signals are converted to L*a*b* (or CIELAB) signals representing the color of the virtual object (or portion thereof). This transformation may be performed as described above with respect to step 416. The transformation of step 518 may be performed using detected white point values $X_n$, $Y_n$, and $Z_n$ determined in step 504.

In step 520, the L*a*b* signals representing the color of the virtual object are mapped to RGB signals or to other signals identifying a display color. This mapping may be performed using, for example, an International Color Consortium (ICC) display profile. In step 522, the display device (e.g. an optical-see-through augmented reality headset) displays the virtual object using the RGB signals.

In some embodiments, instead of using ICC display profiles or similar techniques for determining a display color from L*a*b* signals, other techniques may be used. For example, in some embodiments, a profile is used that converts directly from XYZ or LMS values to a display color. In some embodiments, the spectral radiance $L_{display}(\lambda)$ of a display (or portion thereof) may be known as a function of a display input (e.g. as a function of RGB values). In such cases, to display virtual content with user-adapted LMS values, RGB values may be selected such that the spectral radiance $L_{display}(\lambda)$ of the display substantially satisfies $$L = \int L_{display}(\lambda) \bar{l}(\lambda) d\lambda, M = \int L_{display}(\lambda) \bar{m}(\lambda) d\lambda, \text{ and}$$
$$S = \int L_{display}(\lambda) \bar{s}(\lambda) d\lambda.$$

Similarly, to display virtual content with user-adapted XYZ values, RGB values may be selected such that the spectral radiance $L_{display}(\lambda)$ of the display substantially satisfies $$X = \int L_{display}(\lambda) \bar{x}(\lambda) d\lambda, Y = \int L_{display}(\lambda) \bar{y}(\lambda) d\lambda, \text{ and}$$
$$Z = \int L_{display}(\lambda) \bar{z}(\lambda) d\lambda.$$

Figure 6:
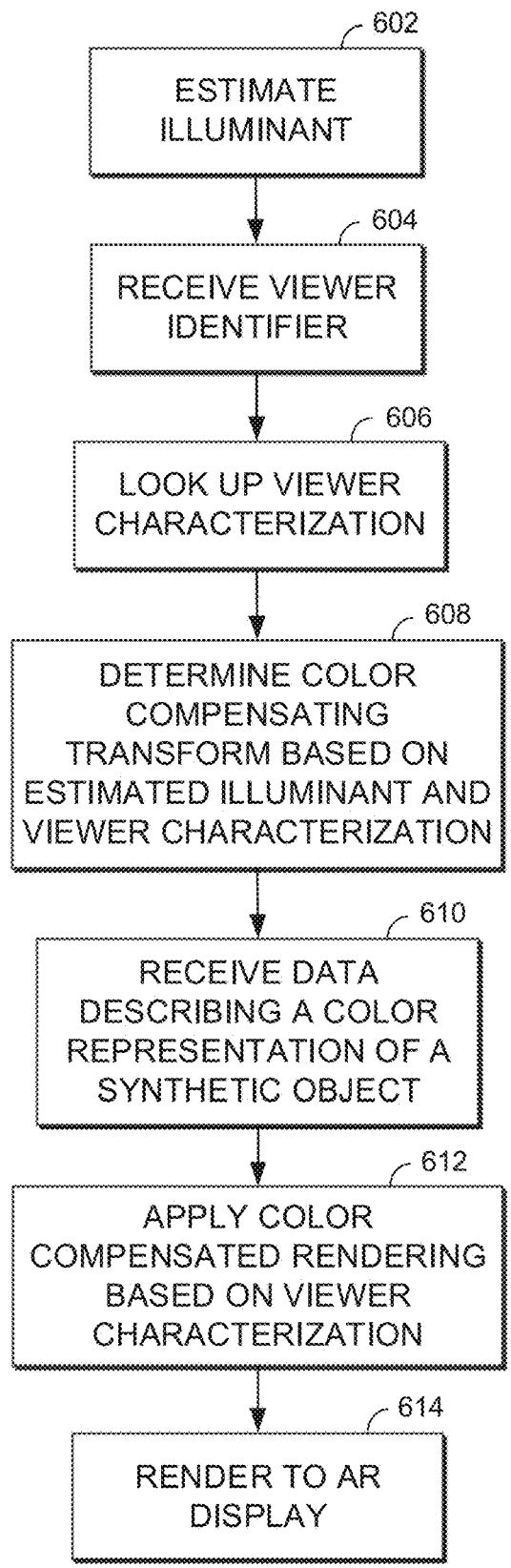
FIG. 6 is a flowchart of a method according to some embodiments.

FIG. 6 is a flow diagram according to some embodiments. Illuminant sensor data arrives at an AR device controller, which then estimates the illuminant information in step 602. In step 604, viewer identification data is received, by the AR device controller. In step 606, the identification data may be used to look up the observer's color sensitivities (e.g., LMS curves), or to permit estimation using age and gender profile norms, for example using techniques described in Asano, Yuta, "Individual colorimetric observers for personalized color imaging" (2015). Rochester Institute of Technology. The color compensating transform, based on observer characterization is then determined in step 608. When the virtual (synthetic) object is specified in step 610, the AR device controller is able to apply color compensation in step 612 based on observer characterization and to render the synthetic object on an AR display in step 614.

In some embodiments, a method for improved color representation may comprise estimating the illumination of a scene, receiving an indication of a current viewer of the display, looking up characteristics of the color sensitivity of the current viewer, computing a color compensating transformation based on the estimated illuminant of the scene and the color sensitivity of the current viewer, receiving data describing a color representation of a synthetic object; computing a color compensated rendering by applying the color compensating transform corresponding to the current user to the color representation of the synthetic object, and rendering the display-specific color values to the display. The color specification of the virtual object may consist of a spectral representation. The illuminant estimation may comprise an estimate of a spectral representation, and may further select among a list of likely illuminants, such as incandescent light, light emitting diode (LED), sunlight, and florescent light. The color specification of the virtual object may consist of a three color channel representation, possibly RGB or a CIELAB color scheme.

In some embodiments, a method for improved color representation of display of virtual content through personalized color sensitivity information may comprise estimating the spectral illumination of a scene, accessing data describing the spectral color representation of a synthetic object, receiving personal color sensitivity information, multiplying the estimated spectral illuminant with the spectral color representation to produce spectral radiance information of the synthetic object (under the scene illuminant), converting the spectral color of the synthetic object into personal LMS color values using the estimated spectral illuminant and the personal color sensitivity information, processing the personal LMS color values to produce XYZ tristimulus values, but still under the scene illuminant, processing XYZ tristimulus values with chromatic adaptation transform to the selected CIE standard illuminant, (for example the CIE D65 illuminant), transforming the XYZ tristimulus values of the synthetic object and the XYZ of the selected standard CIE illuminant into CIELAB color values, computing display specific color values from the CIELAB coordinates using an inverse display model, and rendering the display specific color values. The CIELAB coordinates use the correct observer/illuminant for processing with traditional display color management tools.

In some embodiments, a method for improved color representation of display of virtual content through personalized color sensitivity information comprises estimating a first white point of a scene, accessing data describing the color of a synthetic object including a second white point associated with the synthetic object, receiving personal color sensitivity information, applying a chromatic adaptation transform from the second white point (of the representation of the synthetic object) to the first white point (i.e., the estimated scene white point) to produce XYZ tristimulus values of the synthetic object corresponding to the first white point, determining a transformation from general XYZ color space to personal LMS color space by regressing the personal color sensitivity information with a standard CIE color matching function, using the inverse of the transformation to convert synthetic XYZ colors to personal LMS values, transforming the LMS values to XYZ using the CIE standard observer appropriate for the color management processing, transforming the XYZ tristimulus values of the synthetic object and the XYZ tristimulus values of the spectral estimation of the light source into CIELAB color values, computing display specific color values from the CIELAB coordinates using an inverse display model, and rendering the display specific color values. The same CIE observer should be used for the synthetic object CIELAB.

In some embodiments, personalized Color Matching Functions (CMFs) are determined. A small parameter model may be used to determine the personal CMF via inputs such as age or via brief visual evaluation. Then, the personal CMF are incorporated in the rendering of virtual objects using estimates of the environmental lighting and knowledge of the individuals CMF. Table 1 shows a comparison of two different human observers viewing a rust color ("R"), both without using any of the color compensations methods taught herein and also with using one of the applicable methods. The table illustrates the desired color, R, along with what is displayed, and what is perceived by each of the viewers. RL denotes a slightly lighter shade of the rust color, and RD denotes a slightly darker shade of the rust color.

TABLE 1

Displayed versus Perceived Colors for Two Human Observers

| | Desired | Displayed | | Perceived | Observer |
|---|---|---|---|---|---|
| | Color | Observer 1 | Observer 2 | Observer 1 | 2 |
| Without | R | R | R | RD | RL |
| With | R | RL | RD | R | R |

As illustrated in Table 1, without the compensation, when R is desired, R is displayed for both observers. Observer 1 perceives RD, while Observer 2 perceives RL. That is the observers perceive different colors, neither one of which is correct. However, with proper compensation, when R is desired, RL is displayed for Observer 1 and RD is displayed for Observer 2. Both observers perceive R, the same proper color.

Figure 7:
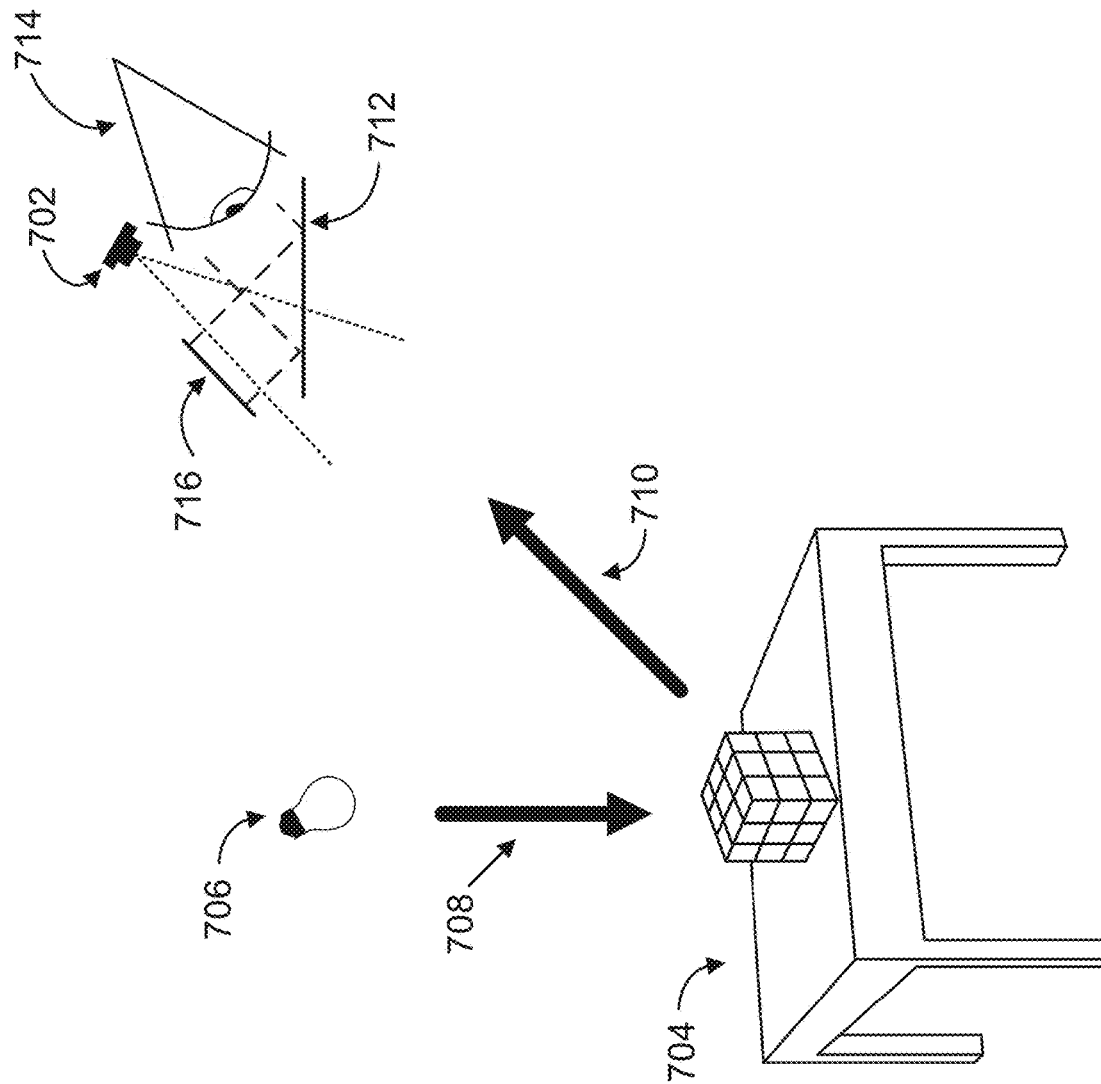
FIG. 7 is an illustration of another AR system for combining synthetic content with real world content, according to a possible configuration used in some embodiments.

FIG. 7 is an illustration of an alternative AR system for combining synthetic content with real world content, according to a possible configuration used in some embodiments. This variation uses a spectral camera 702 inside a head mounted display. This configuration has the advantage of accounting for the actual transmittance of any optical elements in line (half mirror, and/or other elements, such as a face shield).

Figure 8A:
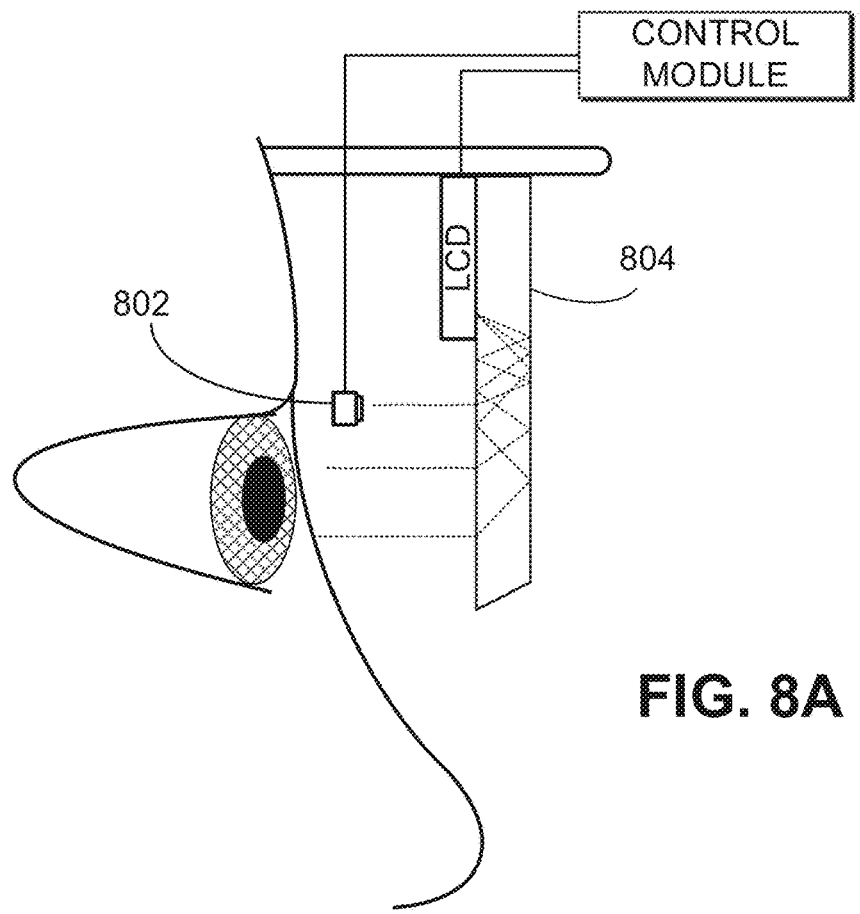
FIGS. 8A and 8B are schematic illustrations of optical-see-through AR displays according to exemplary embodiments.
Figure 8B:
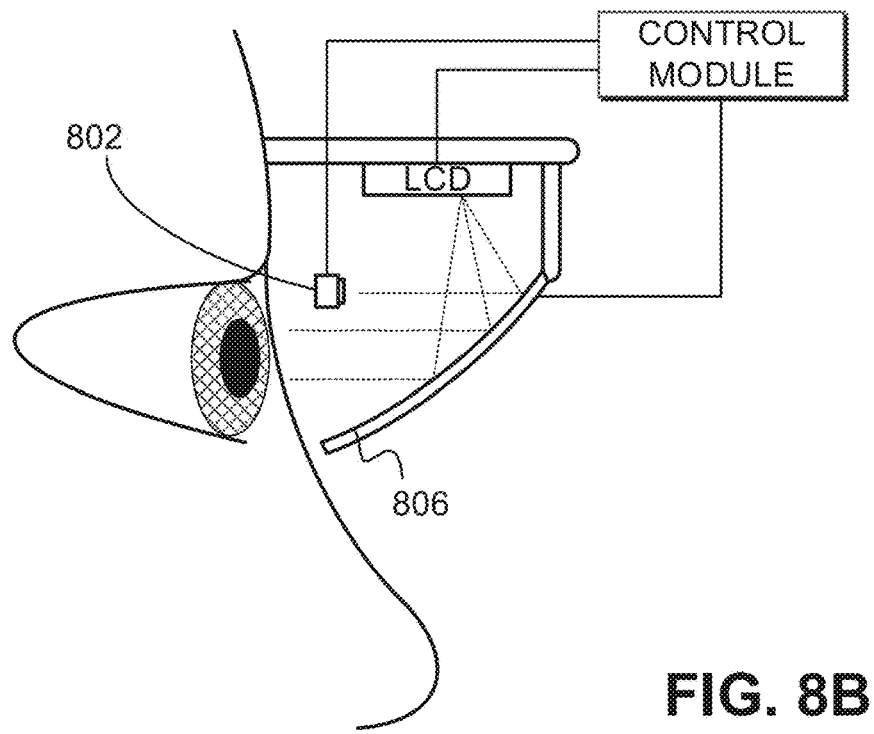

Configurations of AR systems in some exemplary embodiments are illustrated in FIGS. 8A and 8B. In those schematic illustrations, the camera 802 is mounted behind the display surface of the goggles, but outside the observer's view (e.g. above, below, or to the side of the observers view). In FIG. 8A, the display surface is a waveguide based display 804. In FIG. 8B, the display surface is a partly-reflective surface 806.

In some embodiments, the AR system is provided with eye tracking to align the camera image with the user's view.

When making color critical decisions, accounting for metamerism will significantly reduce the mismatches. For example, when choosing clothing or paint via an online store, example embodiments allow the observer to view the correct color, rendered under the scene's particular light source.

The advantages of the exemplary systems may go beyond merely direct color matches, to color coordination. For example, an observer might judge a shirt of a first color and tie of a different color to look good together under a given light source. The aesthetics of the color coordination may be somewhat dependent upon the light source. Example embodiments described here allow a user to test color coordination under various different light sources, with different spectral properties. This allows a user to determine whether the shirt and tie will continue to look good under differing light sources, such as incandescent lights and fluorescent lights.

Exemplary Network Architecture

Figure 9:
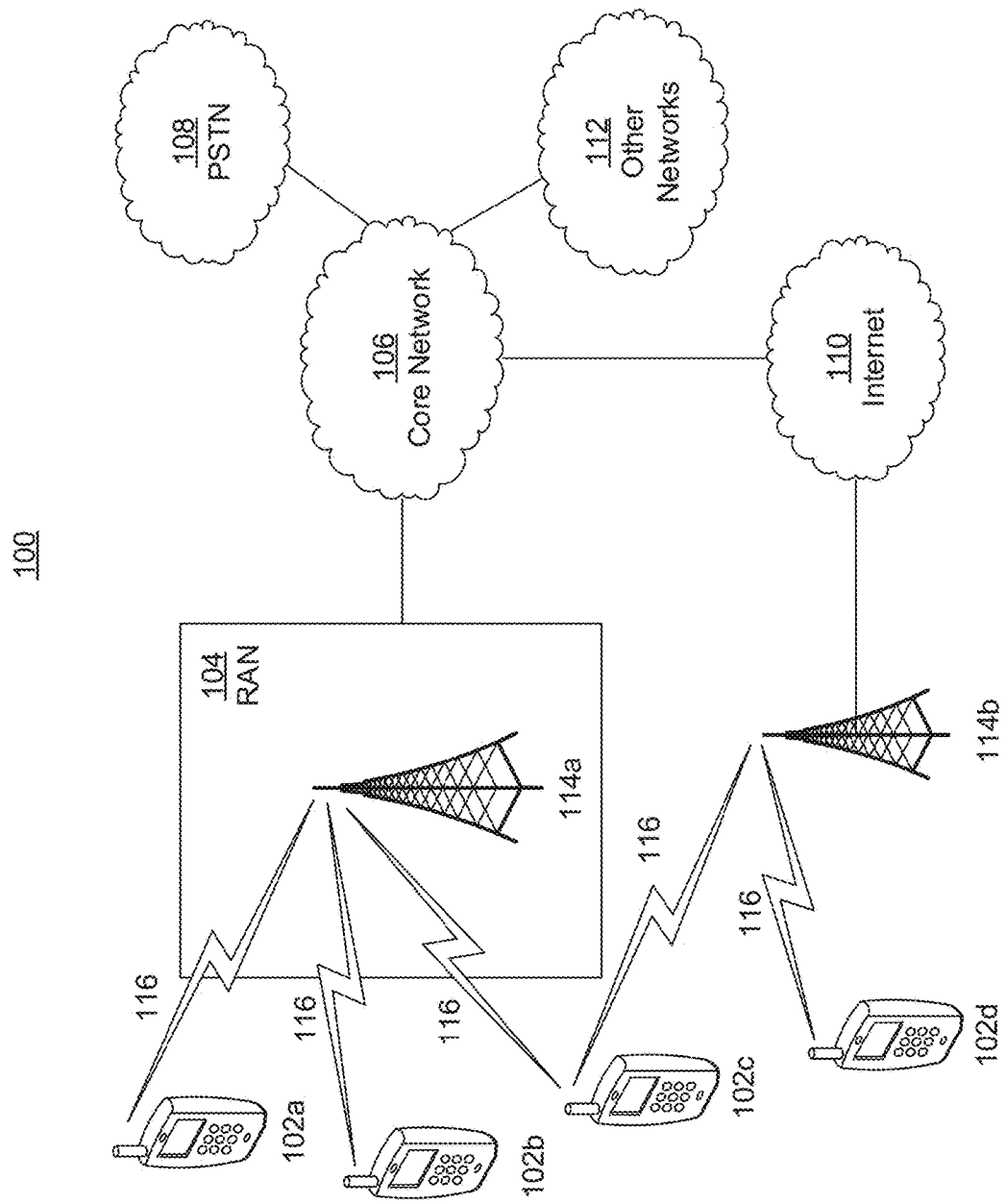
FIG. 9 is a system diagram of an example communications system in which one or more disclosed embodiments may be implemented.

FIG. 9 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 9, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 9 may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 9, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 9, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 9 may be configured to communicate with the base station 114a, which may employ a cellular-based radio technology, and with the base station 114b, which may employ an IEEE 802 radio technology.

Figure 10:
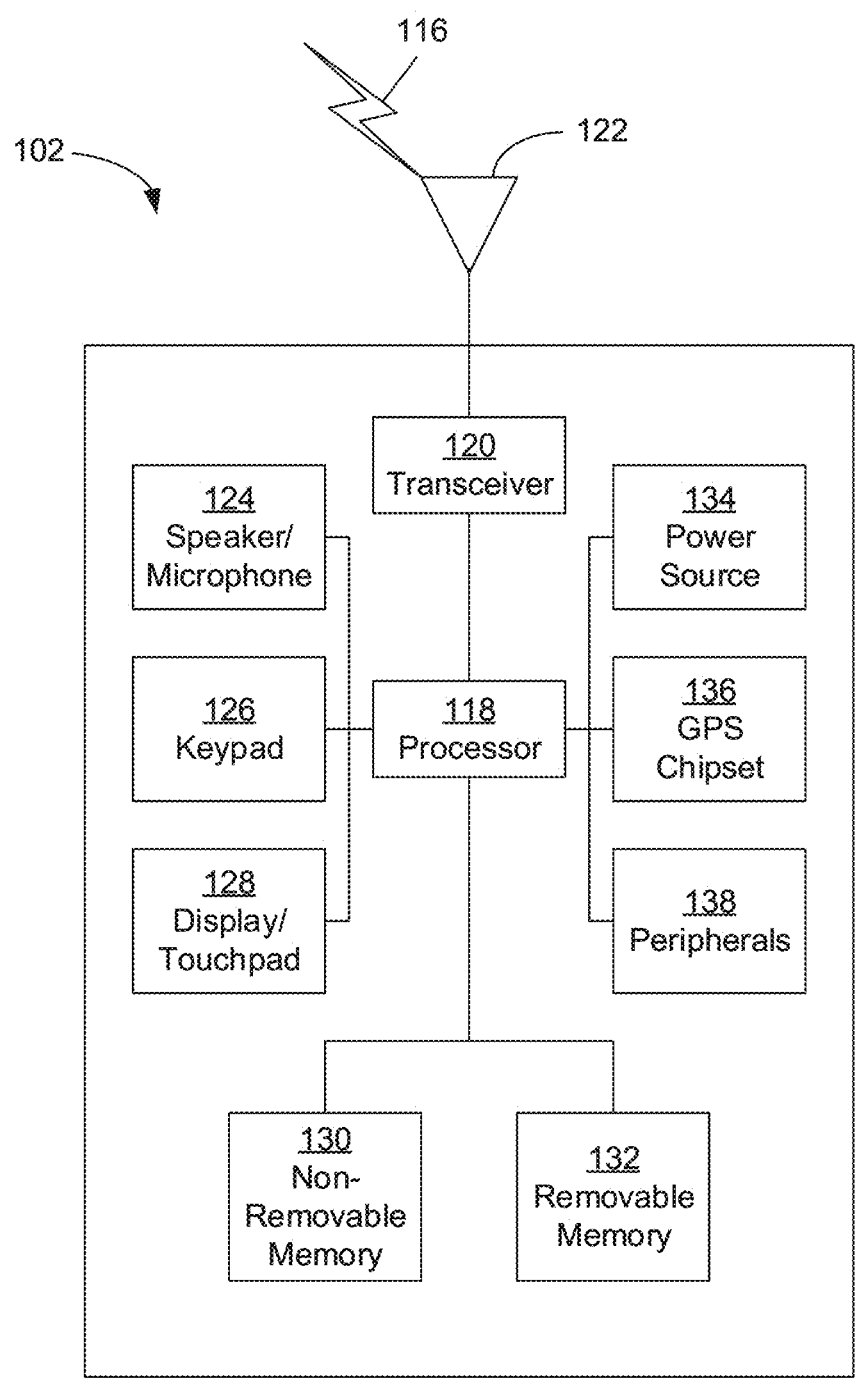
FIG. 10 depicts an exemplary network entity that may be used within a communication system in accordance with some embodiments.

FIG. 10 is a system diagram illustrating an example WTRU 102. As shown in FIG. 10, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 10 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 10 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 9 and 10, and the corresponding description of FIGS. 9 and 10, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method comprising:
   measuring illumination conditions of an environment;
   determining an estimate of spectral illumination based upon illumination condition measurements;
   determining information regarding color-matching characteristics of a user of the display;
   determining spectral reflectance characteristics of at least a portion of a virtual object;
   based at least in part on the spectral reflectance characteristics of the at least a portion of the virtual object, the estimate of spectral illumination and the information regarding color-matching characteristics of the user of the display, determining display color information for the at least a portion of the virtual object; and
   causing display of the at least a portion of the virtual object using the display using the determined display color information for the at least a portion of the virtual object.

2. The method of claim 1, wherein the determination of the display color is further based on the color-matching characteristics of the user of the display.

3. The method of claim 1, wherein determining an estimate of spectral illumination comprises determining a value of an illuminating spectral radiance $S(\lambda)$ for each of a plurality of wavelengths $\lambda$.

4. The method of claim 1, wherein determining information regarding color-matching characteristics of a user of the display comprises determining an age of the user and selecting color-matching characteristics based on the user's age.

5. The method of claim 1, wherein determining information regarding color-matching characteristics of a user of the display comprises retrieving color-matching characteristics based on a user profile.

6. The method of claim 1, further comprising:
   determining spectral radiance of at least the portion of the virtual object based on the spectral reflectance and the estimate of spectral illumination; and
   based at least in part on the spectral radiance, the estimate of spectral illumination, and the information regarding color-matching characteristics of the user of the display, determining tristimulus values representing a color of at least the portion of the virtual object;
   wherein the display color information is determined based at least in part on the tristimulus values.

7. The method of claim 6, wherein the tristimulus values are L, M, and S values and wherein determining display color information comprises:
   converting from the L, M, and S tristimulus values to X, Y, and Z tristimulus values; and
   using a display profile to convert from the X, Y, and Z tristimulus values to RGB values.

8. The method of claim 7, wherein the conversion from the L, M, and S tristimulus values to the X, Y, and Z tristimulus values is based in part on the color-matching characteristics of the user.

9. The method of claim 6, wherein the determination of the display color information is performed using a display profile to convert from the tristimulus values to RGB values.

10. The method of claim 6, wherein the tristimulus values are L, M, and S values, and wherein the color-matching characteristics comprise values of $\bar{l}(\lambda)$, $\bar{m}(\lambda)$, and $\bar{s}(\lambda)$ for each of a plurality of wavelengths $\lambda$.

11. The method of claim 6, wherein the tristimulus values are X, Y, and Z values, and wherein the color-matching characteristics comprise values of $\bar{x}(\lambda)$, $\bar{y}(\lambda)$, and $\bar{z}(\lambda)$ for each of a plurality of wavelengths $\lambda$.

12. The method of claim 6, wherein determining the object spectral radiance comprises determining values $L(\lambda)$ of spectral radiance for each of a plurality of wavelengths $\lambda$ using $L(\lambda) = S(\lambda)R(\lambda)$, where $S(\lambda)$ is an illuminating spectral radiance representing the estimate of spectral illumination and $R(\lambda)$ is a spectral reflectance factor of the portion of the virtual object.

13. The method of claim 6, wherein determining the spectral radiance comprises determining values $L(\lambda)$ of spectral radiance for each of a plurality of wavelengths $\lambda$, wherein the tristimulus values are X, Y, and Z values, wherein the color-matching characteristics comprise values of $\bar{x}(\lambda)$, $\bar{y}(\lambda)$, and $\bar{z}(\lambda)$ for each of a plurality of wavelengths $\lambda$, and wherein the determination of the tristimulus values is performed using:

$$L=\int L(\lambda)\bar{l}(\lambda)d\lambda,\ M=\int L(\lambda)\bar{m}(\lambda)d\lambda,\ \text{and}\ S=\int L(\lambda)\bar{s}(\lambda)d\lambda.$$

14. The method of claim 6, wherein determining the spectral radiance comprises determining values $L(\lambda)$ of spectral radiance for each of a plurality of wavelengths $\lambda$, wherein the tristimulus values are X, Y, and Z values, wherein the color-matching characteristics comprise values of $\bar{l}(\lambda)$, $\bar{m}(\lambda)$, and $\bar{s}(\lambda)$ for each of a plurality of wavelengths $\lambda$, and wherein the determination of the tristimulus values is performed using:

$$X=\int L(\lambda)\bar{x}(\lambda)d\lambda,\ Y=\int L(\lambda)\bar{y}(\lambda)d\lambda,\ \text{and}\ Z=\int L(\lambda)\bar{z}(\lambda)d\lambda.$$

15. The method of claim 6, wherein the tristimulus values are X, Y, and Z values and wherein determining the display color information comprises selecting a display color such that a spectral radiance $L_{display}(\lambda)$ of the display substantially satisfies $$X=\int L_{display}(\lambda)\bar{x}(\lambda)d\lambda,\ Y=\int L_{display}(\lambda)\bar{y}(\lambda)d\lambda,\ \text{and}\ Z=\int L_{display}(\lambda)\bar{z}(\lambda)d\lambda.$$

16. The method of claim 1, wherein the display is a see-through head-mounted display.

17. The method of claim 16, wherein the determination of the display color is further based upon spectral transmission characteristics of the see-through display.

18. The method of claim 16, wherein the measuring of illumination conditions comprises using a forward-facing sensor of the see-through head-mounted display.

19. A method comprising:
   measuring current illumination conditions at an optical-see-through augmented-reality display;
   determining a color-compensating transform for a user of the display;
   determining object spectral radiance of at least a portion of a virtual object;
   based at least in part on the object spectral radiance, the color-compensating transform and the current illumination conditions, determining a display color of a least a portion of the virtual object; and
   displaying the virtual object on the display using the display color for the portion of the virtual object.

20. A system comprising:
   a processor; and
   a non-transitory computer-readable medium storing instructions operative to perform functions comprising:
      measuring illumination conditions of an environment;
      determining an estimate of spectral illumination based upon illumination condition measurements;
      determining information regarding color-matching characteristics of a user of the display;
      determining spectral reflectance characteristics of at least a portion of a virtual object;
      based at least in part on the spectral reflectance characteristics of the at least a portion of the virtual object, the estimate of spectral illumination and information regarding the color-matching characteristic of the user of the display, determining display color information for the at least a portion of the virtual object; and
      causing display of the at least a portion of the virtual object using the display using the determined display color information for the at least a portion of the virtual object.

* * * * *

UNITED STATES PATENT AND TRADEMARK OFFICE
CERTIFICATE OF CORRECTION

PATENT NO. : 10,872,582 B2
APPLICATION NO. : 16/280866
DATED : December 22, 2020
INVENTOR(S) : David Wyble Page 1 of 1

It is certified that error appears in the above-identified patent and that said Letters Patent is hereby corrected as shown below:

In the Claims

Claim 12, Column 23, Line 24: Delete "object";

Claim 13, Column 23, Line 33: Replace "X, Y, and Z" with --L, M, and S--;

Claim 13, Column 23, Line 35: Replace "$\bar{x}(\lambda), \bar{y}(\lambda),$ and $\bar{z}(\lambda)$" with --$\bar{l}(\lambda), \bar{m}(\lambda),$ and $\bar{s}(\lambda)$--;

Claim 14, Column 23, Line 44: Replace "$\bar{l}(\lambda), \bar{m}(\lambda),$ and $\bar{s}(\lambda)$" with --$\bar{x}(\lambda), \bar{y}(\lambda),$ and $\bar{z}(\lambda)$--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*